United States Patent
Kloberdans et al.

(10) Patent No.: US 10,616,077 B2
(45) Date of Patent: Apr. 7, 2020

(54) SYSTEM ARCHITECTURE AND METHODS FOR CONTROLLING AND MANAGING NETWORKING DEVICES AND EXPEDITING NEW SERVICE DELIVERY IN A SUBSCRIBER'S HOME NETWORK USING MICRO-DOMAINS

(71) Applicant: Charter Communications Operating, LLC, St. Louis, MO (US)

(72) Inventors: Michael Kloberdans, Brighton, CO (US); Shlomo Ovadia, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/576,245

(22) Filed: Sep. 19, 2019

(65) Prior Publication Data
US 2020/0076708 A1    Mar. 5, 2020

Related U.S. Application Data

(62) Division of application No. 16/115,976, filed on Aug. 29, 2018, now Pat. No. 10,498,611.

(51) Int. Cl.
| | | |
|---|---|---|
| *H04L 12/46* | (2006.01) | |
| *H04L 12/24* | (2006.01) | |
| *H04L 12/66* | (2006.01) | |
| *H04L 29/12* | (2006.01) | |

(52) U.S. Cl.
CPC ...... *H04L 41/5048* (2013.01); *H04L 12/4633* (2013.01); *H04L 12/4675* (2013.01); *H04L 12/66* (2013.01); *H04L 61/2061* (2013.01)

(58) Field of Classification Search
CPC . H04W 76/10; H04W 16/14; H04W 28/0215; H04W 84/045; H04W 4/50; H04W 80/02; H04W 80/04; H04W 84/18
See application file for complete search history.

(56) References Cited

U.S. PATENT DOCUMENTS

| | | | |
|---|---|---|---|
| 9,778,640 B2 | 10/2017 | Salter | |
| 9,838,865 B2 | 12/2017 | Park et al. | |
| 9,912,609 B2 * | 3/2018 | Jacob | H04L 47/808 |
| 9,961,017 B2 * | 5/2018 | Jacob | H04L 47/828 |
| 9,973,439 B2 * | 5/2018 | Eizadi | G06F 9/45558 |
| 9,986,594 B2 | 5/2018 | Goel et al. | |
| 10,091,276 B2 | 10/2018 | Bloomquist et al. | |

(Continued)

*Primary Examiner* — Liton Miah
(74) *Attorney, Agent, or Firm* — The Marbury Law Group, PLLC

(57) ABSTRACT

Methods and devices are disclosed for controlling and managing a home network, and expediting service delivery on a communications service provider. The communications service provider may receive information identifying one or more service group selected by a subscriber of the communications service provider. The communications service provider may also identify pre-set configurations associated with each of the one or more selected service group, generate configuration instructions for a micro-domain corresponding to each of the one or more selected service group, and create the micro-domain in the home network for each of the one or more selected service group by applying the generated configuration instructions to network services of the communications service provider.

16 Claims, 10 Drawing Sheets

(56) References Cited

U.S. PATENT DOCUMENTS

| | | |
|---|---|---|
| 10,349,462 B2 | 7/2019 | Altman et al. |
| 2017/0272317 A1 | 9/2017 | Singla et al. |
| 2017/0339534 A1 | 11/2017 | Bhalla |

* cited by examiner

SYSTEM ARCHITECTURE AND METHODS FOR CONTROLLING AND MANAGING NETWORKING DEVICES AND EXPEDITING NEW SERVICE DELIVERY IN A SUBSCRIBER'S HOME NETWORK USING MICRO-DOMAINS

RELATED APPLICATIONS

This application is a divisional of, and claims the benefit of priority to, U.S. Non-Provisional patent application Ser. No. 16/115,976 entitled "System Architecture and Methods for Controlling and Managing Networking Devices and Expediting New Service Delivery in a Subscriber's Home Network Using Micro-domains " filed Aug. 29, 2018, the entire contents of which are hereby incorporated by reference.

BACKGROUND

Home networks initially provided users with the ability to wirelessly connect to computer devices with a router to provide Internet access. However, the home networks have become increasingly complex with the advent of Internet of Things (IoT) devices, and the growth of other wireless devices. The demands on home networks for residential and other telecommunications subscribers have been expanding due to a proliferation in new technology. Specifically, the architecture of a typical home network was designed many years ago, and does not adequately support the increasing demands of new technology requirements, deeper security needs, and greater number of user devices.

Most subscribers today connect to the Internet using a single home router or modem/router combination (i.e., home gateway), which provides network connectivity to enable Internet access. However, there is an increasing need to configure, manage, and optimize the performance requirements of a rapidly growing list of diverse devices in the home network architecture in addition to accessing the internet. Specifically, subscribers may want to extend the reach of their wireless local area networks (WLANs), or to add services such as home automation, security, IP video, and sensor networks (e.g., Internet of Things (IoT)). Further, multiple devices (e.g., smartphones, tablets, etc.) may be interconnected within the home for video streaming or remote printing from tablets. Although these goals may be met by adding extra routers or wireless extenders (Mesh Networking) to the home network, such addition may be undesirable for residential subscribers. Further, adding routers may require multiple layers of network address translation (NAT), hindering the ability of devices to easily communicate with one another.

Further, telecommunications service provider networks may include a large variety of uniquely configured hardware devices, presenting challenges for launching new network services. Such challenges may include, for example, investment requirements for the additional appliances, and integration with existing hardware as new technology and services are developed. Therefore, an undesirable lack of flexibility in the network may exist for both service providers and consumers.

SUMMARY

Systems, methods, and devices of various embodiments enable a communications service provider to control and manage a home network, and to expedite service delivery. Controlling and managing the home network, and expediting service delivery, may include receiving information identifying one or more service group selected by a subscriber of the communications service provider, identifying pre-set configurations associated with each of the one or more selected service group, generating configuration instructions for a micro-domain corresponding to each of the one or more selected service group, and creating the micro-domain in the home network for each of the one or more selected service group by applying the generated configuration instructions to network services of the communications service provider.

In some embodiment systems, methods and devices, each service group may be defined by a device type and service parameters. In some embodiment systems, methods and devices, the micro-domain may be optimized for the device type and service parameters of the selected service group. In some embodiment systems, methods, and devices, the micro-domain may be implemented on a home gateway of the subscriber, or within a virtual gateway on a network of the communications service provider.

In some embodiment systems, methods, and devices, the virtual gateway on the network of the communications service provider may be implemented using at least one software-defined isolation method selected from containers or virtual network functions (VNFs).

Various embodiments may include managing the virtual gateway on the network of the communications service provider by implementing a management and orchestration (MANO) framework. In some embodiment systems, methods, and devices, the service parameters of the selected service group may include at least one feature selected from the group of downstream and upstream throughput, maximum allowable latency, service level agreement, or quality of service or experience requirement.

In some embodiment systems, methods, and devices, generating the configuration instructions for each micro-domain corresponding to each of the one or more selected service group may include generating and assigning a unique pre-shared key (PSK), setting parameters to establish a distinct virtual local area network (VLAN) identifier, and allocating a unique range of internet protocol (IP) addresses.

In some embodiment systems, methods, and devices, creating the micro-domain in the home network for each of the one or more selected service group may include determining, for each of the one or more selected service groups, whether to establish a secure tunnel for associated user device data based on the pre-set configurations, and obtaining a first and a second IP address from the allocated range of IP addresses and automatically creating a secure tunnel between the tunnel end points at the home gateway and the virtual gateway in response to determining to establish a secure tunnel for associated user device data for one or more selected service group. In some embodiment systems, methods, and devices, the first IP address may be assigned as a tunnel end point at the home gateway, and the second IP address may be assigned as a tunnel end point at a virtual gateway on the network of the communications service provider. In some embodiment systems, methods, and devices, forming the secure tunnel between the tunnel end points may use a VxLAN encrypted tunneling protocol.

Various embodiments may include determining, for each of the one or more selected service group, whether third party service management is required based on the associated pre-set configurations. In some embodiment systems, methods, and devices, the micro-domain for each of the one or more selected service group may be implemented on the home gateway of the subscriber in response to determining that third party service management is required. In some embodiment systems, methods, and devices, the micro-domain for each of the one or more selected service group may be implemented within the virtual gateway on the network of the communications service provider in response to determining that third party service management is required.

Various embodiments may include creating, in the network of the communications service provider, a perimeter network area configured to receive and control access to data generated by user devices in the micro-domain for the selected service group in response to determining that third-party service management is required for one or more selected service group.

In some embodiment systems, methods, and devices, the device type and service parameters that define the one or more selected service group may be stored as a template by the communications service provider. In some embodiment systems, methods, and devices, the pre-set configurations associated with the one or more selected service group may be stored in one or more operations support system (OSS) element of the communications service provider.

Various embodiments may include determining whether the one or more service group selected by the subscriber is represented in an existing template, and retrieving the existing template from a repository associated with the communications service provider in response to determining that the one or more service group selected by the subscriber is represented in an existing template. In some embodiment systems, methods, and devices, generating the configuration instructions corresponding to each of the one or more selected service group may be performed using the existing template.

Various embodiments may include detecting one or more user device connected to the home network, identifying features of each detected user device, and automatically assigning each detected user device to a micro-domain of the home network based on the identified features.

Various embodiments may include determining whether user input is received from the subscriber indicating a chosen micro-domain for one or more detected user device, and re-assigning the one or more detected user device to the chosen micro-domain in response to determining that user input is received from the subscriber indicating the chosen micro-domain.

Various embodiments may include determining whether a new user device is requesting access to the home network, and identifying features of the new user device and automatically assigning the new user device to a micro-domain of the home network based on the identified features in response to determining that a new user device is requesting access.

In some embodiment systems, methods, and devices, detecting the one or more user device connected to the home network may be based on information received from the home gateway by the communications service provider, and identifying features of each detected user device may be based on device characteristics. In some embodiment systems, methods, and devices, the device characteristics may be identified from manufacturer-configured information stored in memory on the detected user device. In some embodiment systems, methods, and devices, the device characteristics include at least one of intended use, capabilities, and operating parameters associated with the user device.

Systems, methods, and devices of various embodiments also enable management of a home network associated with a subscriber of a communications service provider. Managing the home network may include detecting an end user device connected to the home network, passing information about the detected end user device to a network associated with the communications service provider, receiving information about a micro-domain to which the end user device is assigned, and controlling access to the home network by the end user device based on the assigned micro-domain.

In some embodiment systems, methods, and devices, the information may provide an identity and operating characteristics of the end user device. In some embodiment systems, methods, and devices, the micro-domain may include a distinct virtual local area network (VLAN) and subnetwork associated with a set of network access policies for the end user device.

In some embodiment systems, methods, and devices, the network access policies may be configured to provide an optimized operating environment for devices having common needs to those of the end user device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
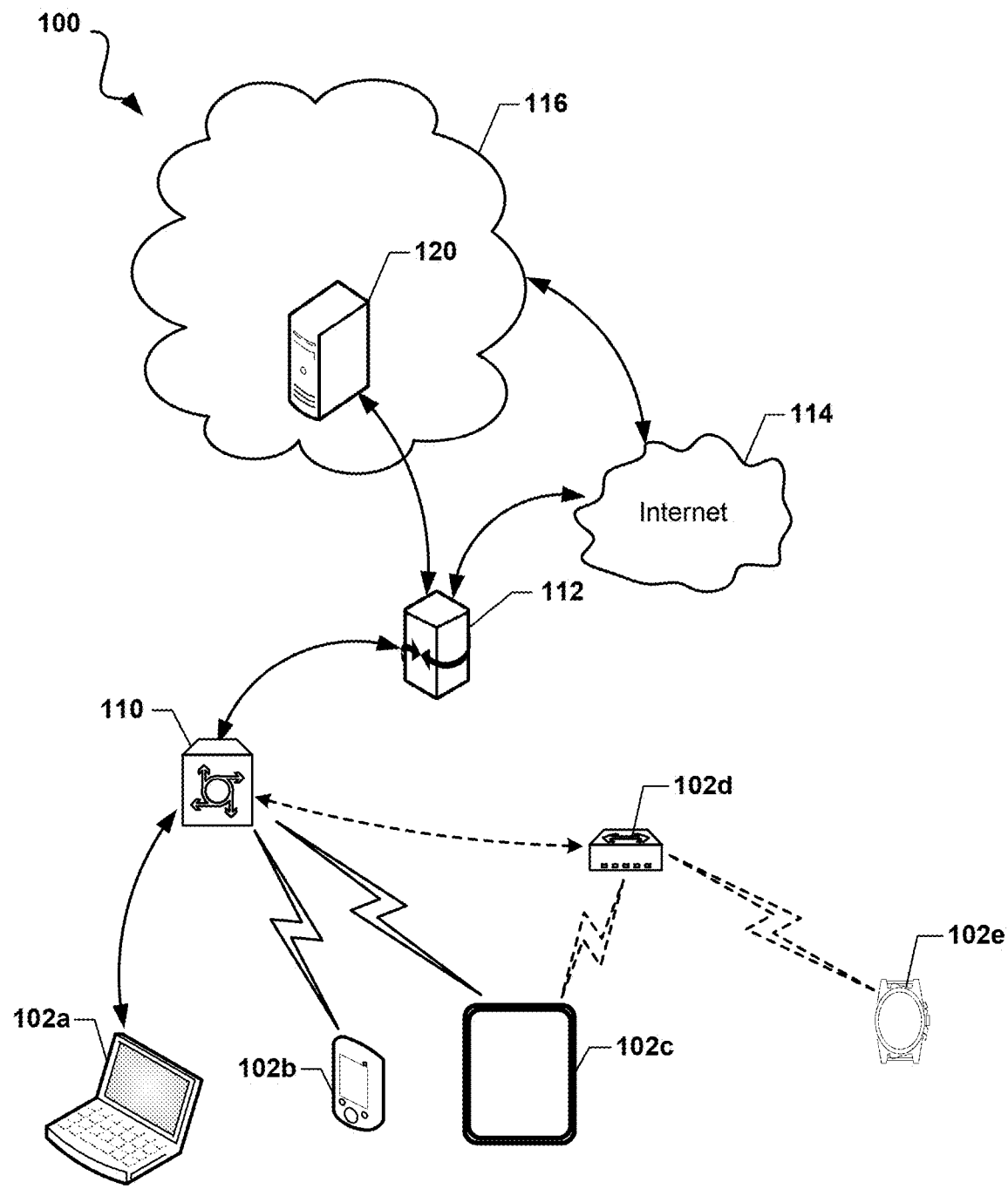
FIG. 1 is a communication system block diagram of a communication network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "user device," "end user device," "computing device," and "wireless device" are used interchangeably herein to refer to any one or all of satellite or cable set top boxes, laptop computers, rack mounted computers, routers, modems, optical network units (ONUs), cellular telephones, smart phones, personal or mobile multi-media players, convertible laptops/tablets (2-in-1 computers), personal data assistants (PDAs), personal computers, tablet computers, smart books, ultrabooks, notebooks, palm-top computers, desk-top computers, mobile gaming consoles, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for establishing wired or wireless communication pathways and for transmitting/receiving data via a telecommunications network as well as providing the functionality described herein. The term "computing device" may further refer to stationary computing devices including personal computers, desktop computers, all-in-one computers, workstations, super computers, mainframe computers, embedded computers, servers, home theater computers, and game consoles.

The terms "telecommunications network," "telecommunications system," "communications system," "service provider network," "service network," and "communication network," "home network" are used interchangeably herein to describe a transmission system that enables user data and control information to be exchanged between various sites, using wired and/or wireless infrastructure. Examples of telecommunication networks that may be used herein include cable television, internet, mobile networks, and combinations thereof.

The terms "home gateway," "customer premises equipment (CPE)," and "subscriber CPE" are used interchangeably herein to describe one or more device that allows a local area network (LAN) associated with a subscriber to connect to a wide area network (WAN) via a modem. The connection to the WAN may be performed using digital subscriber line (DSL)/Ethernet, coaxial cable, fiber-optic cable, wireless satellite, a broadband or other type access technology. Examples of home gateway devices that may be used herein include wired and wireless routers, wireless access points, cable modems, ONUs, DSL modems, combined router/modem units, and network switches.

The terms "telecommunications service provider," "communications service provider," "network service provider," "service provider" "multiple system operator," and "network operator" are used interchangeably herein to describe a provider of telecommunications services that controls elements to sell and deliver services to an end user, and provides necessary provisioning and credentials as policies implemented in user device subscriptions.

The terms "user data," "subscriber data," and "device data" are used interchangeably herein to refer to data traffic that is configured for transmission to or reception from one or more user device in subscriber's home network.

The term "server" is used herein to describe any computing device capable of functioning as a server, such as a master exchange server, web server, mail server, document server, or any other type of server. A server may be a dedicated computing device or a computing device including a server module (e.g., running an application which may cause the computing device to operate as a server).

Telecommunications networks are widely deployed to provide various services, such as connectivity to an internet service provider (ISP) or a media content provider, sending and receiving voice data, packet data, broadcast messages, etc.

The architecture of a conventional residential home network is based on a CPE device designed to provide internet access to a limited number of user devices associated with the subscriber. Since the initial use of the conventional residential home network only implemented a limited number of user devices associated with the subscriber, each of the user devices associated with the subscriber may be managed under a one-size-fits-all home network architecture that allocated the same security, quality of service (QoS), bandwidth, etc. parameters to each device regardless of the individual device needs.

However, there has generally been a large increase in the number of user devices seeking access to each home network, whether regularly or on a temporary basis. For example, a single subscriber may employ multiple personal devices simultaneously (e.g., a smailphone, a tablet, a laptop computer, a smart watch, a gaming system, a smart TV, etc.). Guests visiting the subscriber's residence may also connect to the home network for a period of time using their own personal devices.

Further, new types of user devices are commercially available that employ machine-to-machine (M2M) communications. For example, internet-of-things (IoT)/smart devices may be M2M-connected objects that utilize sensing components to monitor and/or gather information, which is exchanged with other systems without human interaction. Such devices may use any of a plurality of wireless standards (e.g., Wi-Fi, Z-Wave, Zigbee, Lutron Clear Connect, Kidde, Bluetooth, and Wi-Max, etc.). M2M-connected objects may be mobile or fixed within the home network, and may include, medical devices, security cameras, gaming consoles, clocks, speakers, lights, door bells, cameras, HVAC, and automotive vehicles (collectively, "smart home" devices). Multiple M2M-connected devices within a residence may be interconnected and controlled through a single home automation/IoT hub ("smart home hub"). The smart home hub may be any of a number of commercially available devices, for example, a Wink Hub, Amazon Echo, Google Home, Samsung SmartThings, etc.

Due to the sensitive data that is sent to and received from smart home devices, a higher level of privacy and security may be desired than is possible using a conventional CPE architecture.

Moreover, the user devices in a subscriber's home network may have a variety of different operating constraints and service preferences (e.g., bandwidth, required QoS, privacy, etc.) that are not addressed by the one-size-fits-all home network architecture. For example, a subscriber may want low latency and high bandwidth for a gaming console in the home network to be able to support video gaming The subscriber may also want a personal computer used to work from home to have connectivity with dedicated, assured bandwidth, and M2M-connected objects/IoTs in the residence to operate in isolation from other devices in the home network. Other smart home devices may require high security encryption settings, but may accommodate high latency and low QoS settings. A conventional subscriber's home network architecture is typically not configured to prioritize or provide different types of service across connected user devices.

Development of recent technology has led to an increase in features implemented on home gateway devices. However, introducing new features or changes to existing features may take a long period of time, given that home gateway devices may be supported by multiple vendors that each have their own proprietary firmware and different hardware. Certain home network functions may be moved to the cloud (e.g., implementing on the service provider's network) to reduce complexity at the subscriber's CPE. However, virtualization of network functions in this manner does not assist in the shortcomings in the one-size-fits-all network architecture at the home gateway.

Therefore, typical home gateways may not provide optimal environments or support for the array of various user devices and resulting increased complexity. Moreover, subscribers may be unprepared to configure and/or manage the administration needs of the home network with various new user device technologies.

The various embodiments enable a subscriber CPE to efficiently manage different user devices by segmenting the home network into micro-domains. Specifically, micro-domains group user devices together into sub-groups that have similar performance requirements and/or design intents (i.e., a "service group"), and automatically configures an optimized environment for that service group in the home network. The use of the micro-domain architecture in the various embodiments provides sufficient flexibility to address the needs of both traditional user-connected devices and M2M-connected (i.e., smart home) devices.

In various embodiments, a micro-domain for a particular service group may be configured as a distinct virtual LAN (VLAN), or multiple VLANs providing layer 2 (i.e., data link) isolation. The VLAN has the same attributes as a physical LAN, but allows devices that are not connected on the same network switch to be grouped together.

The micro-domain feature for the particular service group may also be configured as a separate subnetwork (subnet) of the network address assigned to the subscriber's home gateway (e.g., Internet Protocol version 4 (IPv4) address, Internet Protocol version 6 (IPv6) address, etc.). Therefore, the micro-domain feature also provides layer 3 (i.e., network) isolation. Additionally, the micro-domain feature may be configured with other pertinent characteristics that are relevant to the operating environment for the particular service group, such as bandwidth, latency, and/or QoS requirements, as well as a customized level of privacy and security features. In this manner, a distinct micro-domain defined for a service group enables the home network to provide a unique combination of network features for user devices with common needs. In various embodiments, user devices that are in one micro-domain may be unable to communicate with those in a different micro-domain unless a business policy is configured as an exception to allow such communications In various embodiments, various telecommunications services may be provided to subscribing customers via a connection to a network, such as a cellular telephone network, WAN, LAN, WLAN, terrestrial network, satellite network, etc., and/or other well-known technologies. Such networks may be accessed via any of a number of wireless and/or wired connections, including through a radio frequency (RF) resource, wireless adapter, coaxial cable, fiber optic cables, DSL interface, Worldwide Interoperability for Microwave Access (WiMAX), or an Integrated Service Digital Network (ISDN) interface.

The various embodiments may be implemented within a variety of communications systems, an example of which is illustrated in FIG. 1. The communications system 100 may be employed by a multiple system operator (MSO), internet service provider (ISP), cellular service provider, or other type of service provider that facilitates messaging and/or other network-based messaging/signaling between one or more server connected to the Internet or other external network.

The communications system 100 may include a plurality of end user devices 102 (e.g., 102a, 102b, 102c, 102d, 102e, collectively referred to as end user devices 102), which may be configured to communicate via a Wi-Fi network, an Ethernet network, a cellular telephone network, a radio access network, a WiMAX network, and/or other well-known technologies. The end user devices 102a-102d may each be configured to receive and transmit data and control signals to and from an access point 110 (e.g., a wireless access point, router, hub, broadband gateway, base station, etc.), which may be coupled to a controller operable to transmit the data and control signals between to other network destinations. The controller may be, for example, a service gateway, wireless LAN controller (WLC), cellular base station, radio network controller, etc. For each end user device 102a-102d, signaling with the access point 110 may be performed via a wireless and/or a wired connection. In some embodiments, one or more end user device 102d may function as a smart home hub. Such end user device 102d may provide a centralized IoT connection point for M2M-enabled devices, which may include one or more end user device 102c in communication with the access point 110 and/or additional end user device(s) 102e.

The access point 110 may communicate with an access gateway 112 of a communications service provider (e.g., a packet data network gateway (PGW), a cable modem termination system (CMTS), a wireless access gateway (WAG), broadband network gateway, etc.) that serves as the primary point of entry and exit for end user device traffic. The access gateway 112 may be implemented in a single computing device or in many computing devices.

Functions of the access gateway 112 may include, but are not limited to, forwarding data and control signals to network components as user data packets, providing connectivity to external data sources/networks, managing and storing network/internal routing information, and/or acting as an anchor between different technologies (e.g., Wi-Fi, broadband, 3G/4G/5G systems, etc.). The access gateway 112 may also coordinate the transmission and reception of data to and from the Internet 114, and the transmission and reception of voice, data and control information to and from an external service network connected to the Internet 114, as well as other access points 110.

Through the access gateway 112, the end user devices 102 may be connected to a service network 116 either directly or via the Internet 114. The service network 116 may control a number of services for individual subscribers, such as management of billing data and selective transmission of data, such as multimedia data, to a specific end user device 102. The service network 116 may be implemented in a single computing device or in many computing devices, and typically includes one or more server 120, such as a media server of a content provider, a communication server, etc. Each end user device 102 may be, for example, a smartphone, a laptop computer, a tablet computer, a smartphone, or any other suitable end point device capable of connecting to a LAN. In general, the end user devices 102 may include a platform that can receive and execute software applications, data and/or commands transmitted over the communication network that may ultimately come from the service network 116, the Internet 114 and/or other remote servers and networks.

The various embodiments are particularly useful with broadband (e.g., ONU, wireless satellite, cable modem or DSL modem etc.) networks to obtain access to service provider core network. However, the embodiments may also be implemented over any combination of wireless and/or wired networks and access protocols, with no changes to the methods.

Each service group may be defined by a device type, as well as a set of service parameters and/or pre-set configurations that provide an ideal environment for the device type. In various embodiments, the device type, service parameters, and pre-set configurations for the various service groups may be stored on a server or data center associated with the service provider network. The term "data center" as used herein may refer to the physical and/or hardware-based resources (e.g., a group of networked servers) used for data storage and processing, network operations, and/or network management for the service provider network. The combination of a service provider network and underlying data center(s) may be referred to herein as a "service provider network/data center."

As an example, a service group for healthcare devices may be defined as operating with a bandwidth of less than 1 Mbps and without a specified QoS, requiring a maximum latency of 400 ms, and requiring access to a printer connected to the home network. The healthcare devices service group may also be defined by pre-set configurations requiring use of an encrypted tunnel for data transport privacy and/or isolation. The tunnel may be created using any of a number of encrypted tunneling protocols, for example, (e.g., (e.g., Virtual Extensible LAN (VxLAN), Internet Protocol Security (IPSec), generic routing encapsulation (GRE), etc.).

In another example, a service group for a home office may be defined as requiring a guaranteed bandwidth of 100 Mbps, a maximum latency of 50 ms, access to the home network printer, and a moderate QoS level. The home office service group may also be defined by pre-set configurations requiring use of a virtual private network (VPN) protocol to ensure data security and authentication.

In another example, a service group for precision gaming may be defined as requiring a bandwidth of 10 Mbps, a maximum latency of 4 ms, and a high QoS level, without requiring access to the home network printer. Further, the precision gaming service group may be defined by pre-set configurations that do not require advanced security.

In various embodiments, the pre-set configurations for each service group may include a classification of whether management by a third party service is required (i.e., "managed" or "unmanaged"). In particular, groups for which network access features only require initial setup and are rarely revisited may be classified as unmanaged, while groups that are associated with more complex or dynamic features and/or require monitoring of other systems to function as desired may be classified as managed. For example, the healthcare devices service group described above may be defined as a managed service, whereas the precision gaming service group may be defined as unmanaged. In some embodiments, the specific third party service and/or type of management required may be included in the pre-set configurations.

In various embodiments, the configuration and management of micro-domains based on service groups may be primarily performed on the service provider network/data center using templates. Templates in the various embodiments may be data structures that package multiple service groups and associated configuration instructions under a unique identifier (e.g., number, code, etc.). In some embodiments, configuration instructions of a template may be automatically generated based on the service parameters and pre-set configurations of the service groups therein. Such configuration instructions may include those that direct internal operations on the service provider network/data center, as well as external operations (e.g., billing, customer communications, home gateway implementation, etc.). That is, the use of a template in various embodiments may activate various systems to create, implement, and manage services in order to create corresponding micro-domains for the home network.

Creating micro-domains based on a template may be initiated for a subscriber's home network via a subscriber selection portal. Specifically, the service provider network/data center may provide to a subscriber a list of names (i.e., device types) of each service group available for selection. The portal may be in the form of a website that can be accessed for example, by a user device configured with a display and capable of receiving user input (e.g., a smart phone, a laptop computer, a tablet, etc.). Some of the selectable service groups offered to the subscriber may be free of charge, while other service groups may require payment, such as a one-time fee or based on a monthly subscription. In some embodiments, the selectable service groups listed through the portal may be customized based on the geographic location of the subscriber.

The subscriber may choose one or more selectable service group from the list. Upon receiving the subscriber's selection(s), the service provider network/data center may compare the selected service groups to existing templates, and if available, may retrieve an existing template that matches or contains all of the selected service group(s). In some embodiments, the subscriber's selection(s) may be sent to a template manager on the service provider network/data center. In some embodiments, the template manager may forward the service group choices to a template master that is configured to determine whether they are available as an existing template. In various embodiments, the template manager and template master may be implemented on the service provider network/data center as software modules in an application executed on a server processor, as hardware modules (e.g., hardware components wired to perform such functions), or as combinations of hardware components and software modules running on one or more processors.

If the selected service groups are not available as an existing template, the template master may forward a request to the service provider engineering and/or marketing entities to automatically create a new template. If the selected service groups are available in an existing template, the template master may retrieve the existing template and pass it to the template manager for use in the home network. In communication with other components of the service provider network/data center, the template manager may generate configuration instructions to begin micro-domain implementation. For example, generating the configuration instructions may involve authorizing the operations support system/business support system (OSS/BSS) to add services needed for the particular service group, to change billing for the subscriber, and to begin contract processes to engage outside parties, if needed. Further, generating the configuration instructions may involve steps by network service components, such as an Authentication, Authorization and Accounting (AAA) server to mediate network access for the micro-domains, a Dynamic Host Configuration Protocol (DHCP) domain manager to assign a range of IP addresses to each micro-domain as a separate subnet, and others.

The use of templates in various embodiments may provide an easy method to control an expanding number of offered service groups. Further, templates provide a mechanism for classifying service groups as managed or unmanaged in order to focus attention needs for supporting organizations. That is, a template may provide a vehicle to "see at a glance" which service groups (and the service parameters/pre-set configurations thereof) should be home gateway/CPE-based and which should be virtual gateway/virtual CPE/cloud-based. The use of templates may also provide an easy mechanism for validating billing for services rendered.

Figure 2:
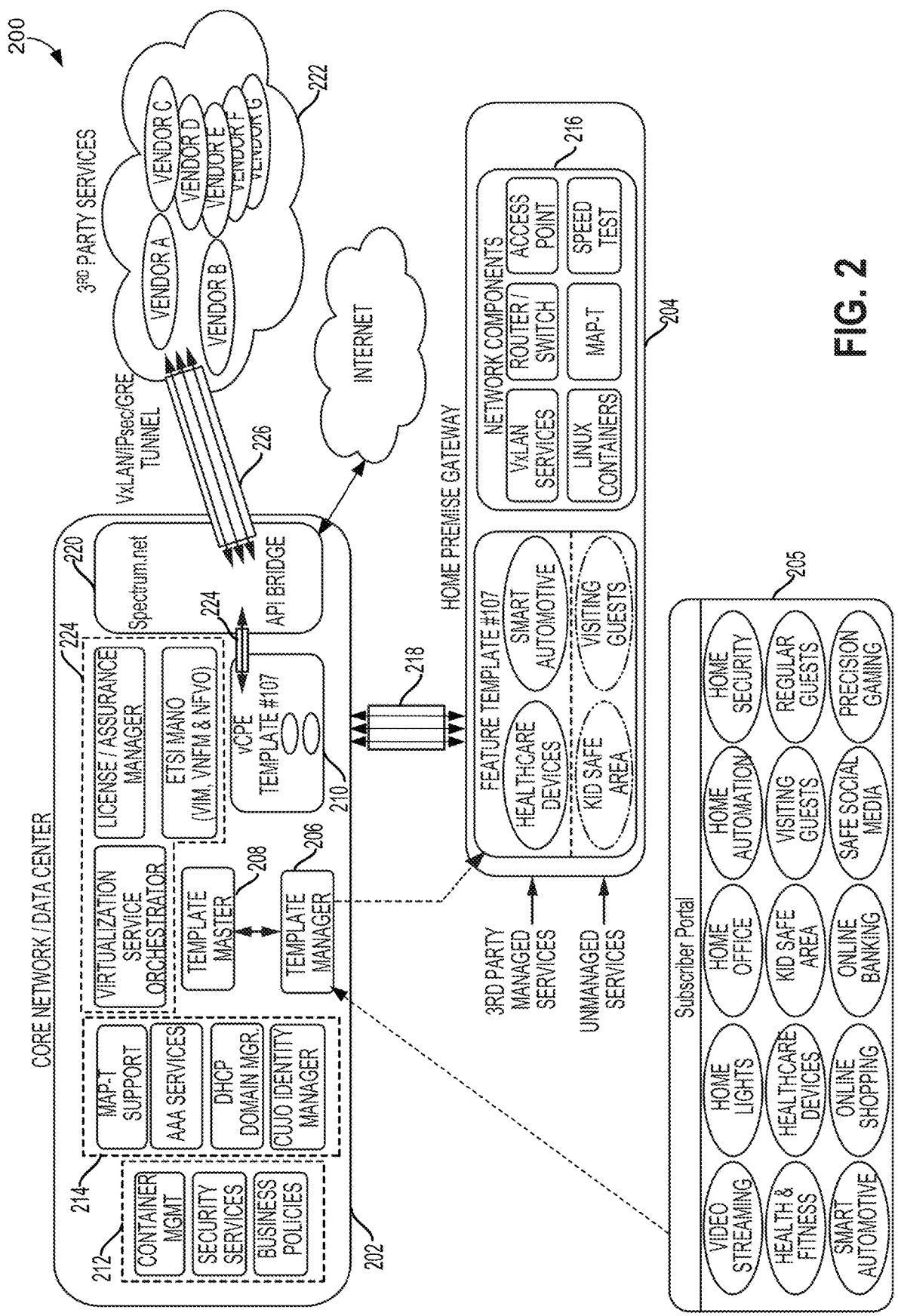
FIG. 2 is a block diagram illustrating an example architecture of a communications system implementing micro-domains according to various embodiments.

An end-to-end architecture of a micro-domain management and control system 200 implemented by a service provider network is illustrated in FIG. 2. With reference to FIGS. 1-2, the system 200 may be similar to communications system 100 and/or components thereof The system 200 may include a service operator's core network and/or data center (i.e., service provider network/data center 202), as well as a home premise gateway associated with the subscriber's home network (i.e., home gateway 204).

In some embodiments, the service provider network/data center 202 may supply communications services over coaxial cable to customers including the subscriber. The home gateway 204 may therefore include or be connected to a cable modem, which may in turn feed into a CMTS or other access device associated with the service provider network.

In various embodiments, micro-domain organization and management for a subscriber's home network may be provided by various components of the service provider network/data center 202. For example, a template manager 206 of the service provider network/data center 202 may receive subscriber input selecting from a list of available service offers through a subscriber portal 205, and forward the subscriber input to a template master 208. The template master 208 may identify a template that provides service parameters and pre-set configurations for a plurality of service groups in order to implement corresponding micro-domains. For example, the "Feature Template #107" is configured to create micro-domains for each of two managed service groups (i.e., "Healthcare Devices" and "Smart Automotive), and for each of two unmanaged service groups (i.e. "Kid Safe Area" and "Visiting Guests"). As described in further detail below, the service provider network/data center 202 may host the unmanaged Kid Safe Area and Visiting Guests micro-domains, for example, as a virtual CPE 210. The managed Healthcare Devices and Smart Automotive micro-domains may reside on the home gateway 204.

The service provider network/data center 202 may implement a number of services and functions to support the micro-domain architecture described herein. For example, the service provider network may include an operations support system/business support system (OSS/BSS) 212 that provides network management and/or other functions. Such functions may include container management, which provides control of service groups (i.e., containers) at a detailed level. The OSS/BSS 212 functions may also include security services, which may develop the service parameters related to security for various service groups, as well as establish configuration instructions to employ the parameters in setting up a corresponding micro-domain. The OSS/BSS 212 functions may also include business policies to provide a subscriber with the option to apply various customizations to individual micro-domains, on top of those implemented in the service parameters and pre-set configurations of a selected template. For example, some business policies may enable exceptions to micro-domain isolation by allowing a particular message type to be passed between devices in different micro-domains. Other example business policies may include parental control parameters, access to peripheral devices, etc.

The service provider network/data center 202 may also include network services 214, for example, MAP-T support and AAA services. Further network services 168 may include a DHCP domain manager that controls the allocation of unique IP addresses to each micro-domain when created. In some embodiments, the DHCP domain manager may communicate with, or incorporate, a DHCP server connected to a DHCP database. The DHCP server may assign Internet Protocol (IP) addresses to various devices (e.g., subscriber CPEs, or other computing devices) to access to the network. Additionally or alternatively, the DHCP server may be used to assign address or access information using other protocols.

Further, the network services 214 may include an identity manager, which may employ a CUJO agent to automatically identify and group end user devices. In particular, the identity manager may recognize an end user device's behavioral patterns based on, for example, device type, brand, and/or model, as well as other device-specific properties, operational system, etc. The identity manager may alternatively employ MUD, or any other device identification system capable of intelligently recognizing an end user device for the purpose of placement in the correct micro-domain.

The network services 214 provided on the service provider network/data center 202 in various embodiments may be configured to support the network components 216 implemented on the subscriber's home gateway 204, regardless of whether specific micro-domains/templates actually reside on the home gateway or on the service provider network/data center. Such network components 216 may include, for example, those that provide Linux containers, MAP-T functions, Speed test functions, access point(s), router/switch functions, and/or encrypted tunnel services. Specifically, subscriber traffic to or from the home gateway 204 may be connected to the service provider network core by applying, across the network gateway(s), tunneling protocol (e.g., IPSec, VxLAN, GRE, etc.). The tunneling protocol may be used to provide virtual point-to-point links over a layer 3 (e.g., IP) network, which may be implemented as home gateway tunnels 218. The home gateway tunnels 218 in various embodiments may connect to the home gateway 204, and may terminate at the service provider network/data center 202, such as on a network gateway. The home gateway tunnels 218 may provide an encrypted path between the managed services template (e.g., feature template #107) and the vCPE 210. In some embodiments, end user devices in a particular user device group 404 may require the use of secure Generic Routing Encapsulation (GRE) tunneling in order to shield private data from unauthorized access. Therefore, creating a corresponding micro-domain on the home gateway 204 may automatically initiate creation of an encrypted home gateway tunnel between a user device group and the service provider network/data center 202 (e.g., the vCPE 210). In some embodiments, one or more optional tunnel 224 may be created between the vCPE 210 and the perimeter network area 220. Creation of optional tunnel(s) 224 may be based on whether the preference of the communications service provider as to whether the information transferred between these entities should be tunneled.

In some embodiments, support of the micro-domain architecture may be designed to incorporate future software trends and/or features, including virtualization on the service provider networks. For example, the creation of micro-domains may be integrated with Network Functions Virtualization (NFV) on a telecommunication service provider's network. NFV leverages standard virtualization technology to consolidate many network equipment types.

In particular, NFV involves the virtualization and implementation of network functions in software that can run on industry standard server hardware. NFV may be applied to any data plane packet processing and control/management plane function in a network infrastructure, allowing flexibility in the network architecture for the service provider. Further, virtual implementations from independent software vendors can be used remotely, when and where the corresponding virtual network functions (VNF) are needed. NFV standards are currently under development by ETSI, details of which are set forth in the following documents, the contents of which are incorporated by reference in their entireties: ETSI GS NFV 003 V1.2.1 (2014-12), "Network Functions Virtualization (NFV); Terminology for Main Concepts in NFV"; ETSI GS NFV 004 V1.1.1 (2013-10), "Network Functions Virtualization (NFV); Virtualization Requirements"; and ETSI GS NFV-MAN 001 V1.1.1 (2014-12), "Network Functions Virtualization (NFV); Management and Orchestration," and many others.

In some embodiments, the service provider network/data center 202 may include virtualization support elements 224, such as a management and orchestration (MANO) system (also referred to as "ETSI-MANO"), which may in turn include an NFV orchestrator (NFVO), a virtual network function (VNF) manager (VNFM), a virtualized infrastructure manager (VIM), and other functions. The elements of the MANO system may be in communication with the OSS/BSS 212 and/or other systems implemented by the service provider network/data center 202. In some embodiments, the virtualization support elements 224 may also include a license/assurance manager and a virtualization service orchestrator.

Configuration instructions for the micro-domains corresponding to the service groups of a template may include various identifiers. In some embodiments, a selected template's configuration instructions may cause the service provider network to assign, for each micro-domain, a unique VLAN identifier or VLAN group identifier. The configuration instructions may also cause the service provider network to assign a unique IP address range within the host part of the IP address for the home gateway. Further, the configuration instructions of the template may include a unique pre-shared key (PSK) that may be assigned to each micro-domain and utilized to prevent unauthorized joining by an outside device. In various embodiments, the PSK for a micro-domain may be a Wi-Fi Protected Access PSK (WPA-PSK). Specifically, a WLAN passphrase (8 to 63 characters) may be generated for a particular micro-domain, from which a 256-character WPA-PSK for the micro-domain may be generated Segmenting the home network into isolated micro-domains may be performed using operating-system-level virtualization (i.e., containerization). In various embodiments, a subscriber's home network may implement any of a variety of containerization platforms (e.g., Docker, Rocket, Linux Containers (LXC), etc.) to run software packages referred to as "containers." Specifically, features that define a service group, as well as its associated configuration instructions, may be bound on either the home gateway (e.g., subscriber CPE) or on the virtual gateway of the service provider network/data center (e.g., a virtual CPE) using containers or other software function technologies.

The containers may be isolated from one another, with their own set of tools and libraries, and may be created from the templates and related information. In some embodiments, containers may be managed at a high level by the template manager, and at the individual level using a management system, examples of which may include Kubernettes, Apache Mesos, Reference Design Kit for Broadband (RDK-B), and OpenWRT. Thus, while micro-domains inherently require a more structured and complex management of the home network, the management is executed invisibly to the subscriber.

In various embodiments, the configuration instructions for a selected template may automatically create a micro-domain on subscriber's CPE for each managed service group, and a micro-domain on the virtual CPE for each unmanaged service group. Such micro-domains provide isolation to end user devices connected to the home network, providing a unique privacy since devices within each micro-domain cannot see or access those within another micro-domain. Further, each micro-domain may implement policies that benefit or limit the devices therein. In this manner, micro-domains can provide an improved and/or optimized environment to meet the design intent of like devices (e.g., with particular bandwidth, QoS, latency, security, and/or other settings).

In various embodiments, the service provider network may be configured to use any of a variety of technologies to identify and automatically assign the user devices in a subscriber's home network to an existing micro-domain, or signal the need to create a new micro-domain. As an example, an identity manager may utilize identification technology, such as a CUJO agent to evaluate the behavioral patterns and specific features of each user device that connects to the subscriber's home network. Other examples may include device fingerprinting, and/or new identification technologies such as manufacturer usage description (MUD)

Additionally, a secure device connection (SDC) may be implemented by the service provider network/data center to assist in dynamically managing micro-domains of a subscriber's home network. Specifically, for each micro-domain, the SDC may gather performance data from user devices, and validate the performance needs of such devices against the service parameters that were used to develop the micro-domain as an optimized environment. If, for example, bandwidth needs of a particular micro-domain approaches the limit stated in the service parameters, a proactive alert can be issued to address the need before an issue occurs.

In some embodiment, the pre-set configurations of a service group may require use of an encrypted tunnel in the corresponding micro-domain. The tunnel may provide data privacy within the home network and through the data transport path. Therefore, the configuration instructions of a selected template including such service group may include information sufficient to establish the encrypted tunnel according to one of a number of protocols. For example, the VxLAN protocol can identify over 16.7 million unique tunnel instances through a VxLAN Network Identifier (VNI) field in the header. In this manner, sensitive device data may be identified as being from the subscriber's home gateway, as well as from the particular user device that is assigned to that micro-domain.

As described, a key feature of the micro-domain architecture is isolation between groups of similar devices in the home network. Similarly, entities outside the home network (e.g., third parties, other users, etc.) may be generally unable to access the user devices within various micro-domains unless authorized in the pre-set configurations of the corresponding service group. Accordingly, if data from user devices may be requested or required by an outside party in a particular micro-domain, a controlled space for data collection may be used, such as a perimeter network area 220. The perimeter network area 220, also referred to as a "demilitarized zone" or "API bridge," may serve as a proxy function and/or controlled data repository to provide a bridge between the service provider network and an outside party seeking access (e.g., third party services 222). The outside party may be, in some embodiments, a medical vendor or institution that monitors data for a healthcare device, a public utility provider that collects meter or sensor readings (e.g., water, gas, electricity usage, etc.) for smart home device.

Specifically, data collected by user device(s) in a subscriber's home network may be sent to the service provider network, which may in turn store the data in the peripheral network area until retrieval through an authorized session with the outside party. Alternatively, if polling is needed in order to obtain data from a user device, the proxy function poll the device and transfer the data to the publicly accessible repository for relay to the outside party. In this manner, outside parties are prevented from entering the service provider's network, protecting both the service provider and the user data/devices. In some embodiments, third party service tunnel 226 may be established between the perimeter network 220 and corresponding third party services 222.

The term "system-on-chip" or "SoC" is used herein to refer to a set of interconnected electronic circuits typically, but not exclusively, including multiple hardware cores, a memory, and a communication interface. The hardware cores may be of a variety of different types of processors, such as a multi-core central processing unit (CPU), a multi-core digital signal processor (DSP), a multi-core accelerated processing unit (APU), and a multi-core auxiliary processor.

Figure 3:
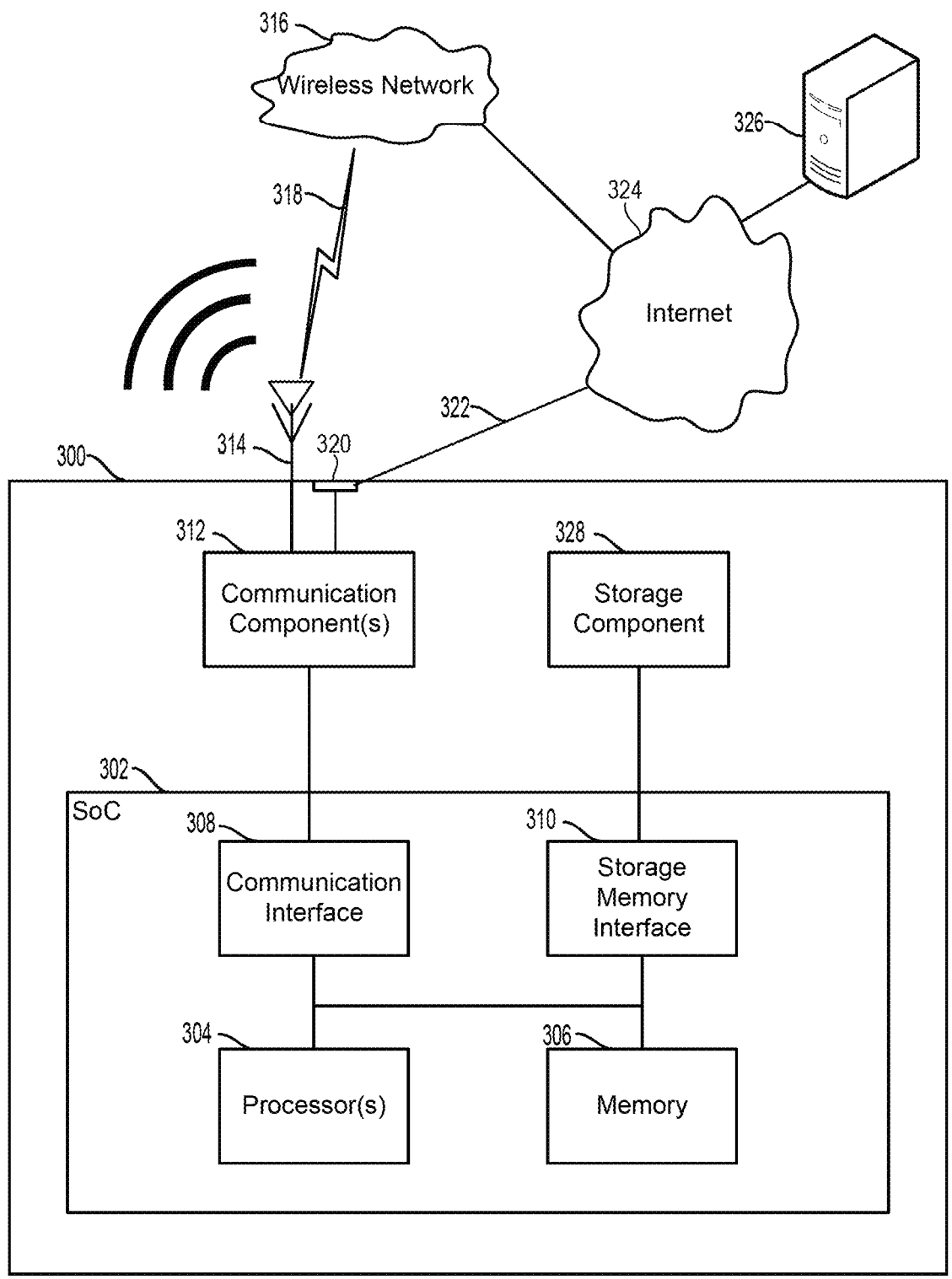
FIG. 3 is a component block diagram illustrating a computing device suitable for implementing an embodiment.

FIG. 3 illustrates an example of a home gateway 300 associated with a subscriber that may be suitable for use with the various embodiments. With reference to FIGS. 1-3, the home gateway 300 may be an example of one or more access point 110. In some embodiments, the home gateway 300 may be any terminal or equipment that is located at the subscriber's premises (e.g., a residence, a workspace, etc.), and connected to a communications service provider's network at the demarcation point with the service provider network. The home gateway 300 may be a residential gateway, examples of which may include a wired or wireless router, cable modem, DSL modem, network switch, wireless access point, internet access gateway, or unit that functions as a combination thereof. In some embodiments, the home gateway 300 may be any device (e.g., a set-top box, fixed mobile convergence product, or subscriber unit) that accesses, and/or enables devices connected to a LAN to access, services offered by a communications service provider.

The home gateway 300 may include a SoC 302 with a processor 304, a memory 306, a communication interface 308, and a storage memory interface 310. The home gateway 300 may further include at least one communication component 312, such as a network adapter supporting Fast Ethernet or Gigabit Ethernet/multi-Gigabit Ethernet, a modem (e.g., xDSL DOCSIS, LTE, ONU, etc.), a radio frequency (RF) transceiver, and/or a wireless network adapter for Wi-Fi (IEEE 802.11), Bluetooth, etc. Specifically, a communication component(s) 312 supporting wireless communications may include receiver and transmitter circuitry coupled to at least one antenna 314, and configured to perform transmit/receive functions in particular RF spectrum frequency range(s).

A communication component(s) 312 and corresponding antenna(s) 314 may be configured to send data to, and receive data from, devices within a WLAN using a supported wireless communication protocol. Further, a communication component(s) 312 and corresponding antenna 314 may be configured to access an external wireless network 316 for additional features and/or network services. A connection 318 to the wireless network 316 may use any of a number of wireless standards, for example, Wi-Fi, WiMAX, or mobile VoIP, and/or may be based on mobile broadband or cellular network technology. Examples of wireless networks based on cellular network technology may include Code Division Multiple Access (CDMA) networks, Time Division Multiple Access (TDMA) networks, and Frequency Division Multiple Access (FDMA) networks. The wireless network 316 may utilize various radio technologies such as Wideband-CDMA (W-CDMA), cdma2000, Global System for Mobile Communications (GSM), etc.

A communications component(s) 312 may also be coupled to a network interface 320 that supports a wired connection 322 to the internet 324. The home gateway 300 may communicate with, for example, one or more remote computing device 326 over the wireless connection 318 and/or the wired connection 322. In some embodiments, the remote computing device may be a server of a content or other service provider.

The home gateway 300 may include one or more controller, on which any of a variety of processing devices of the SoC 302 (e.g., processor(s) 304) may be implemented, and may include a number of processing cores. The home gateway 300 may also include processors that are not associated with a SoC 302.

The memory 306 of the SoC 302 may be configured for storing data and processor-executable code for access by the processor 304. The memory 306 may include, for example, volatile memory configured to temporarily hold a limited amount of data received from a data sensor or subsystem.

The home gateway 300 may also include a storage component 328, which may be a non-volatile memory device (e.g., a read-only memory, flash memory, hard disk drive, solid state drive, etc.). The storage memory interface 310 and storage component 328 may work in unison to allow the home gateway to store data and processor-executable code on a storage medium. The storage memory interface 310 may control access to the storage component 328, and may allow the processor 304 to read data from and write data to the storage component 328.

The communication interface 308, communication component(s) 312, antenna(s) 314, and/or network interface 320 may work in unison to enable the home gateway 300 to communicate over the wireless network 316 via a wireless connection 318, and/or a wired connection 322 with the remote computing device 326. As described, the wireless network 316 may be implemented using a variety of wireless communication technologies, including, for example, radio frequency spectrum used for wireless communications, to provide the home gateway 300 with a connection to the Internet 324 by which it may exchange data with the remote computing device 326.

It should be noted that some or all of the components of the home gateway 300 may be differently arranged and/or combined while still serving the necessary functions. Moreover, the home gateway 300 may not be limited to one of each of the components, and multiple instances of each component, in various configurations, may be included in the home gateway 300.

As described, the service templates used in various embodiments may include multiple service groups, classify service groups as managed or unmanaged, and initiate actions by system components to create optimized environments—that is, micro-domains—for the service groups. In particular, the use of templates, may provide similar functionality to virtual network functions, without requiring implementing virtualization standards. In some embodiments, support of the micro-domain architecture may be designed to incorporate future software trends and/or features, including virtualization on the service provider networks. For example, the creation of micro-domains may be integrated with NFV on a telecommunication service provider's network. NFV leverages standard virtualization technology to consolidate many network equipment types.

Figure 4:
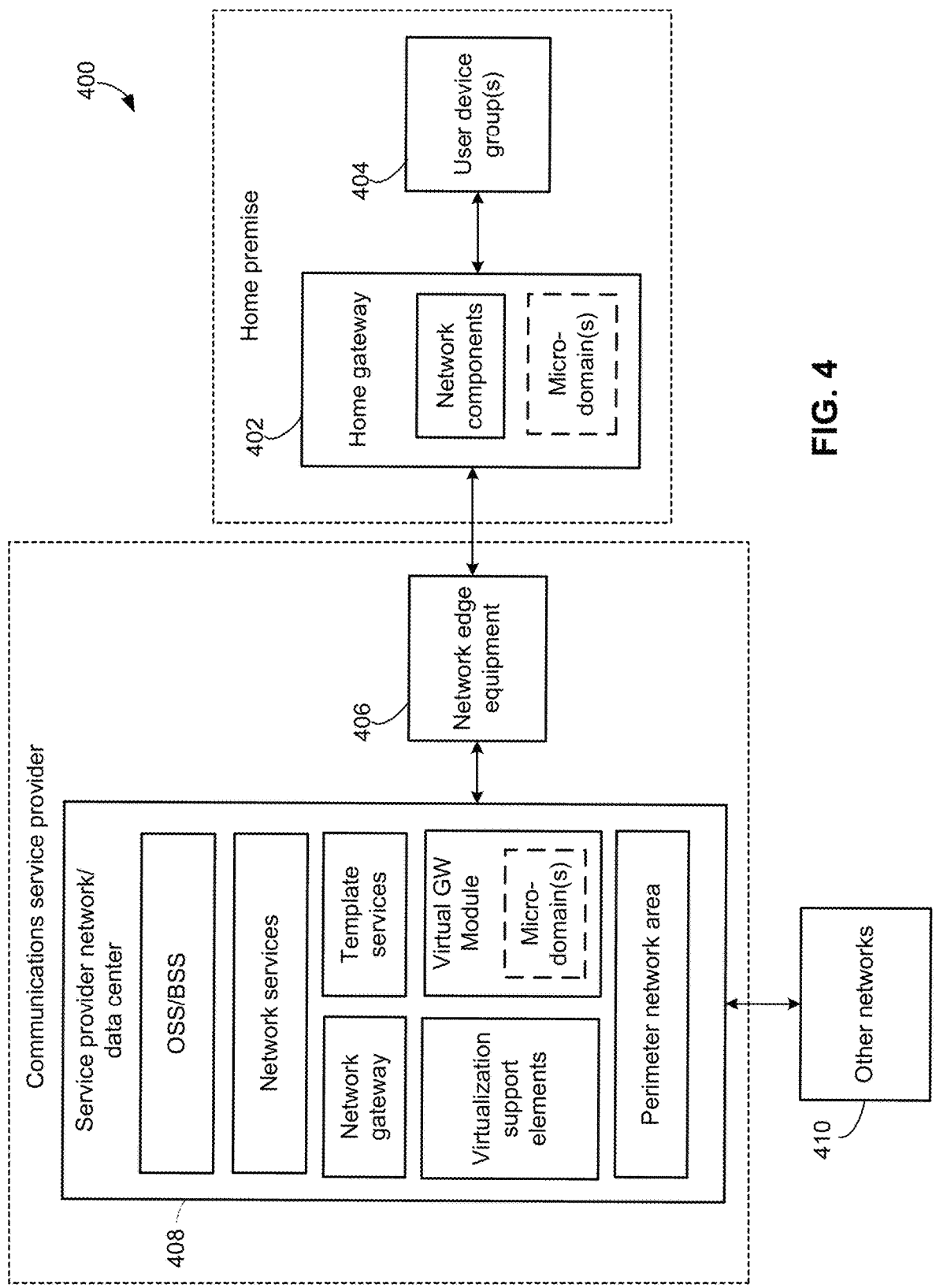
FIG. 4 is a block diagram illustrating an example software architecture that supports micro-domain communication network management in a system configuration according to various embodiments.

FIG. 4 illustrates components of a telecommunications system 400 configured to support home network management using micro-domains in various embodiments. The components of system 400 may be implemented as separate functions through any combination of software and hardware, and may be distributed across a number of different devices and/or servers With reference to FIGS. 1-4, the system 400 may be similar to the communications system 100 and/or system 150, and may be implemented by a service provider offering communication services to at least one residential customer/subscriber.

In some embodiments, a subscriber's home network may be formed through a home gateway 402, which may be similar to the home gateway 300. Examples of home gateways (i.e., subscriber CPEs) may include, but are not limited to, wired and wireless routers, DSL modems, cable modems, fiber modems, wireless modems, dedicated phone connections such as T1 devices, and other devices that interface a communication line to a network. The home gateway 402 may include functionality associated with multiple communications, as well as incorporating multiple network components.

The network elements may be implemented as functionally separate software modules, as physically separate hardware components, or a combination thereof. Specifically, network component functions that may be incorporated within the home gateway 402 include a mapping of address and port using translation (MAP-T) feature that provides connectivity to IPv4 hosts across IPv6 domains on a subscriber CPE (i.e., home gateway). The network component functions may also include internal-to-the-home DHCP server functions, firewalls, VPN, wireless access point functions, etc. Further, the home gateway 402 may be assigned any of a variety of unique identifiers, such as a DSL modem identifier, a Data Over Cable Service Interface Specification (DOCSIS) identifier, a Basic Line Privacy Interface (BPI+) identifier, and/or others.

The home gateway 402 may connect devices in at least one user device group 404. In various embodiments, the user device group(s) 404 may be formed as one or multiple service groups, each of which is defined to include devices having similar design and/or operating environment needs, as described. Each user device group 404 may include one or a plurality of end user devices (e.g., 102). The end user devices may be either directly connected to the home gateway 402, or served using a local access point router subnet employing a NAT/firewall. In various embodiments, the home gateway 402 and the devices of the user device group(s) 404 are part of a home premise 401 (e.g., a subscriber's residence, an office, etc.).

The home gateway 402 may provide connectivity to a service provider network/data center 408 for each user device group 404. The service provider network/data center 408 may perform functions that are distributed across various servers of the core network, or may be implemented on the same server(s).

The home gateway 402 may be any of a variety of CPE devices, such as a wireless or wired router, modem, switch, gateway, or any network processing equipment that can be used to provide an interface for end user devices to an external network via a connection or communication link. The connection or communication link may be any form of wired, wireless, cabled, or optical interconnection to network edge equipment 406.

The network edge equipment 406 in various embodiments may be any edge site, exchange, or interface device that enables access to the network backbone for discrete home LANs. The specific device(s) that constitutes the network edge equipment 406 may depend on the type of physical networking layer used to provide services to subscribers, and may dictate the connection requirements on the home gateway 402. For example, for a service operator providing services over a hybrid fiber-coaxial (HFC) network, the network edge equipment 406 may be a CMTS, and the home gateway may include cable modem functionality. In another example, for a service operator providing services using a DSL network, the network edge equipment 406 may be a DSL access multiplexer (DSLAM), and the home gateway may include DSL modem functionality. In another example, for a service operator providing services using fiber optic cables, the network edge equipment 406 may be an Optical Line Terminal, and the home gateway may include ONU modem functionality.

The network edge equipment 406 may be connected to the service provider network/data center 408 through an access network, which may use Ethernet or another high-speed data communication protocol. In various embodiments, the network edge equipment 406 and service provider network/data center 408 are part of system run by a communications service provider 403 (e.g., a system operator).

The service provider network/data center 408 may be connected to at least one other network(s) 410, which may be a private network or a public network, such as the internet. In this manner, the user device group(s) 404 may establish communications with content provider(s), additional services, and/or remote computing devices (e.g., other users). In some embodiments, access to data from devices in one or more user group(s) by outside entities (e.g., third party services/content providers, etc.) may only be allowed through the peripheral network area of the service provider network/data center 408. The peripheral network area may be a space that serves as a bridge between the service provider network and external entities.

As described, the micro-domains functionality for some user device group(s) may reside on the home gateway 402, while others may be implemented on the service provider network/data center 408 serving as a virtual gateway (VGW)). For example, the micro-domain corresponding to a service group for which third party service management is required may be created on the home gateway 402, as described above. A micro-domain corresponding to a service group for which no management or additional security is required may be created within a virtual gateway of the service provider network/data center 408, which may be transparent to the subscriber and the home network. While various embodiments herein refer to embodiments in which managed service groups reside on the home gateway/subscriber's CPE and unmanaged services reside on the vCPE/VGW, such embodiments are merely examples and not intended to limit the scope of the micro-domain configurations. Specifically, the location of micro-domains for various managed and unmanaged services may be selected by the communications service provider. For example, the communications service provider may provide instructions to create a micro-domain corresponding to a managed service group within a VGW of the service provider network/data center 408, and a micro-domain corresponding to an unmanaged service group on the home gateway 402.

The service provider network/data center 408 may implement a number of services and functions to support the micro-domain architecture described herein. For example, the service provider network may include an operations support system/business support system (OSS/BSS) that provides network management and/or other functions. As described, such functions may include container management, security services, and/or business policies.

The service provider network/data center 408 may also include network services as described, for example, MAP-T, AAA services. DHCP domain management, and/or identity management (e.g., a CUJO AI Device Intelligence platform).

The network services provided on the service provider network/data center 408 in various embodiments may be configured to support the network components implemented on the subscriber CPE, regardless of whether specific micro-domains actually reside on the home gateway or on the service provider network/data center.

The service provider network/data center 408 may also include template services, which may be implemented as a template manager and/or template module as described above. The service provider network/data center 408 may include one or more network gateway (e.g., a wireless access gateway (WAG), a broadband network gateway, etc.). As described, subscriber traffic to or from the home gateway may be connected to the service provider network core by applying, across the network gateway(s), a tunneling protocol (e.g., IPSec, VxLAN, GRE, etc.). The tunneling protocol may be used to provide virtual point-to-point links over a layer 3 (e.g., IP) network. The virtual point-to-point links may be implemented as encrypted tunnels that begin at the user gateway and terminate on the network gateway(s).

The service provider network/data center 408 may also include virtualization support elements that enable the current micro-domain architecture to incorporate NFV, either presently or in the future. As described, NFV involves the virtualization and implementation of network functions in software that can run on industry standard server hardware. In some embodiments, the virtualization support elements may include a management and orchestration (MANO) system, which may in turn include an NFV orchestrator (NFVO), a virtual network function (VNF) manager (VNFM), a virtualized infrastructure manager (VIM), and other functions. The elements of the MANO system may be in communication with the OSS/BSS and/or other systems implemented by the service provider network/data center 408.

Figure 5:
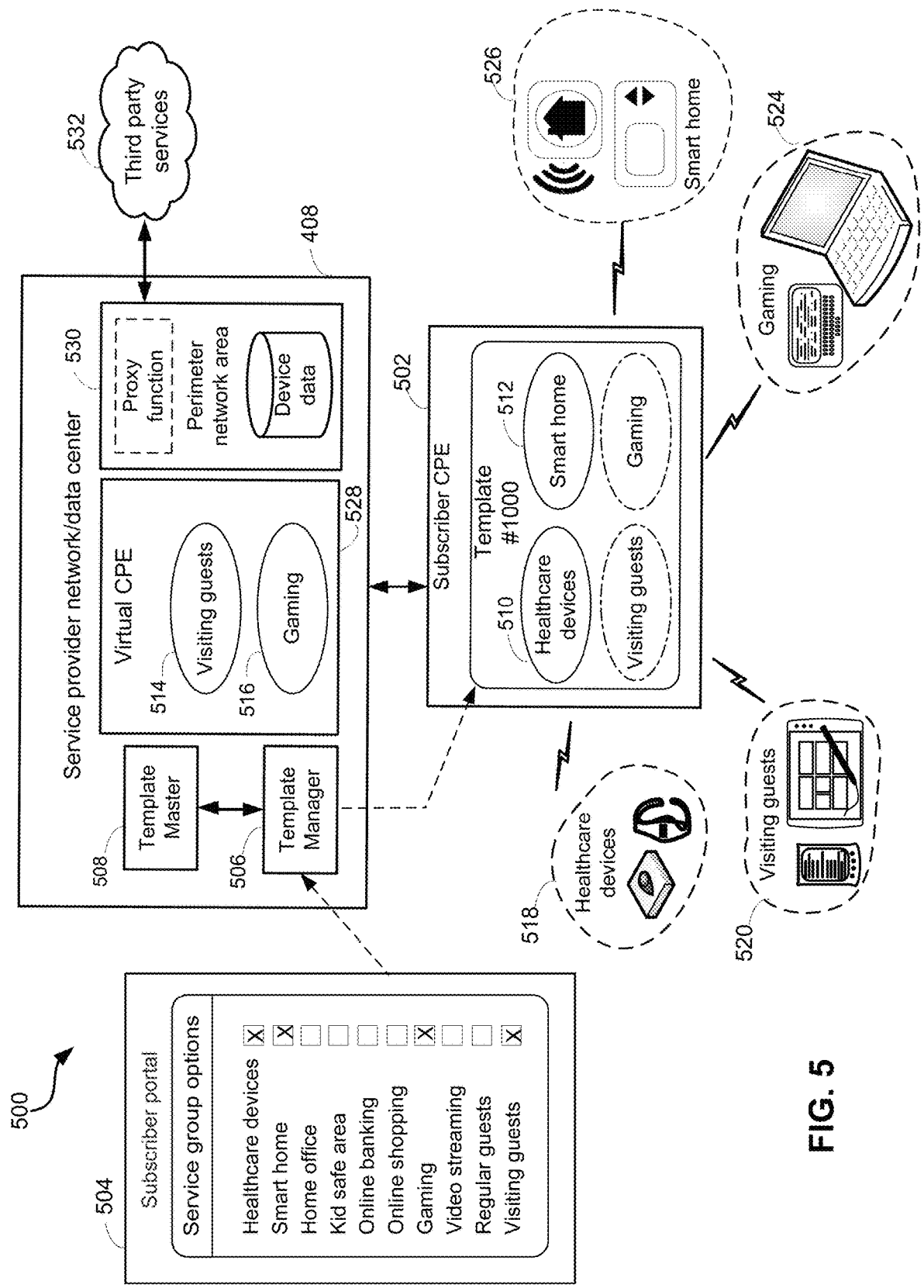
FIG. 5 is a block diagram illustrating the implementation of example micro-domains within the system configuration of FIG. 4.

Applying the micro-domain architecture of the various embodiments for managing home networks may move a substantial amount of the administrative burden from the subscriber to the network service provider. Such burden transfer may be beneficial in that the service provider may be capable of creating a complex home network that can support new services and emerging technologies. The implementation of one or more micro-domains generated from a template may provide a subscriber with any number of different home network customization options, an example of which is illustrated in FIG. 5. In a configuration 500 shown in FIG. 5, a telecommunications system (e.g., 400) may include a service provider network/data center 408. A subscribing customer may be associated with a home network implemented by a subscriber CPE 502 (e.g., the home gateway 402). Through communicating with the service provider network/data center 408, the subscriber CPE 502 may receive network service(s), and provide such service(s) to a plurality of client devices (e.g., end user devices 102 in FIG. 1). Regardless of whether shown in FIG. 5, the system embodied by configuration 500 may include any and all of the components, features, and modules of the system 400 described above with reference to FIG. 4.

To manage the plurality of client devices, the subscribing customer may access a subscriber portal 504 through a website, which may display a list of service groups options available to the subscribing customer. The service group options may be based at least in part on the geographic location of the subscriber CPE or affiliated with the subscribing customer. In the example shown by configuration 500, the subscribing customer selects four (4) service groups from the ten (10) service group options listed: "Healthcare devices," "Smart home," "Gaming," and "Visiting guests." The selections input by the subscribing customer are reflected in the marked boxes of the graphic user interface provided by the subscriber portal. In some embodiments, additional customization options (not shown) may be provided through the subscriber portal, such as additional business policies, options for manually assigning an end point device to an existing micro-domain, etc.

Information identifying the four selected service groups is sent to a template manager 506, which passes them to a template master 508. The template manager 506 and template master 508 may be services that are implemented by the service provider network/data center 408 as a combined or separate component(s) or software module(s). An existing template, "Template #1000," is identified by the template master 508 as containing the Healthcare devices, Smart home, Gaming, and Visiting Guests service groups. Template #1000 is retrieved by the template master 508 and provided to the template manager 506. Each service group of Template #1000 may be defined by the device type (indicated by the service group name), and a set of service parameters and pre-set configurations. Configuration instructions for each service group in Template #1000 are generated by the template manager 506, which may require communications between the template manager 506 and other systems/components in the service provider network/data center 408, which most likely is stored in an OSS element. The configuration instructions associated with Template #1000 are applied to the subscribing customer's home network (or VGW) to create each of the Healthcare devices micro-domain 510, the Smart home micro-domain 512, the Visiting guests micro-domain 514, and the Gaming micro-domain 516. The Healthcare devices micro-domain 510 may be optimized for devices, objects, and/or sensors that monitor medical data (e.g., pulse, blood pressure, blood glucose levels, etc.) and/or automatically perform clinical functions (e.g., dispense medication, activate notification/alarm, etc.) for a patient. The Smart home micro-domain 516 may be optimized for a smart home hub and/or various M2M-connected devices within the same residence (e.g., smart cameras, speakers, lights, doorbell, television, etc.).

The Visiting guests micro-domain 514 may be optimized for personal devices (e.g., smart phones, tablets, mp3 players, etc.) that belong to temporary visitors. The Gaming micro-domain 516 may be optimized for precision gaming devices (e.g., home consoles, handheld game consoles, set top boxes, connected headsets, precision gaming devices, etc.).

End user devices in the subscriber's home network may be automatically assigned to an appropriate micro-domain, thereby forming corresponding user device groups of similar-needs devices. For example, in configuration 500, user device groups 518, 520, 524, 526 correspond respectively to the Healthcare Devices micro-domain 510, Visiting Guests micro-domain 514, Gaming micro-domain 516, and Smart Home micro-domain 512.

The Healthcare devices and Smart home micro-domains 510, 512 reside locally on the subscriber CPE 502, while the Visiting guests and Gaming micro-domains 514, 516 reside remotely on the service provider network/data center 408. Specifically, the service parameters and pre-set configurations of the Healthcare devices and Smart home service groups specify that management by a third party service is required for each, as well as secure data transport using an encrypted tunnel protocol. Therefore, the configuration instructions generated for these groups of Template #1000 implement the corresponding micro-domains (i.e., 510 and 512) on the subscriber CPE 502. However, the service parameters and pre-set configurations of the Visiting guests and Gaming service groups do not require any third party management or additional security protocols. Therefore, the configuration instructions generated for these groups of Template #1000 implement the corresponding micro-domains (i.e., 514 and 516) in a memory area designated as a virtual CPE 528 on the service provider network/data center 408.

To enable secure third-party service management for devices assigned to the Healthcare devices micro-domain 510 and the Smart home micro-domain 512, a perimeter network area 530 within the service provider network/data center 408 is used. Data output by devices in the user device group 518 or 526 may be stored in a data repository of the perimeter network area 530 (e.g., demilitarized zone) and subsequently retrieved by an authorized third party service 532. Alternatively, the data output by devices in the user device group 518 or 526 may be polled by a proxy service and transferred to the perimeter network area 530, followed by release of the polled data to the third party service 532.

The references to various micro-domains, service groups, and other components are arbitrary and used merely for the purposes of describing the embodiments. That is, any indicator, name, or other designation to differentiate data and processing associated with different groups and devices may be assigned, without changing the embodiment methods.

Figure 6:
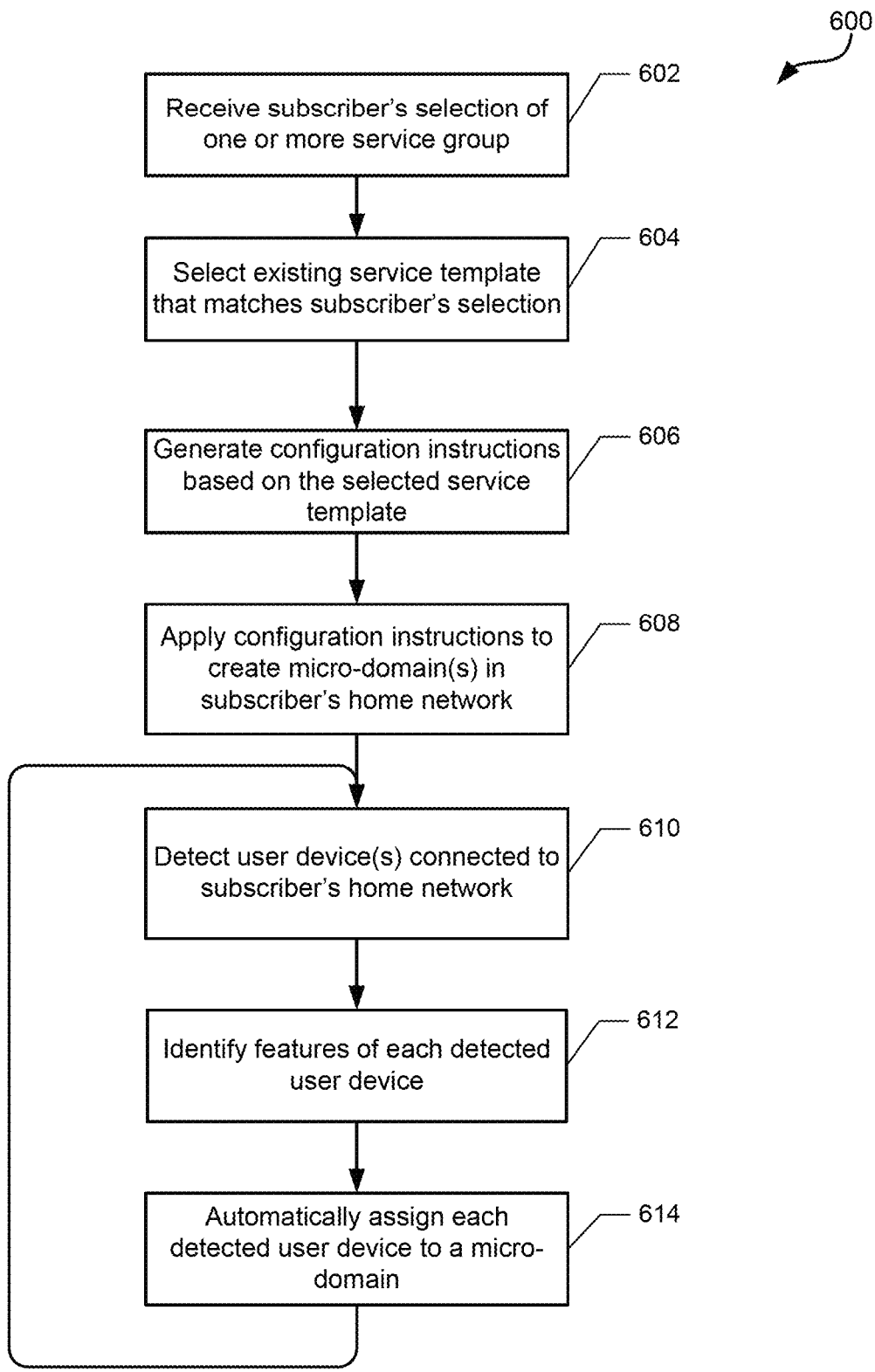
FIG. 6 is a process flow diagram illustrating an embodiment method for creating micro-domains in a subscriber's communication network according to various embodiments.

FIG. 6 illustrates a method 600 of implementing micro-domains for a subscriber's home network according to some embodiments. With reference to FIGS. 1-6, the operations of the method 600 may be implemented by one or more control entity within a service network (e.g., service network 116, service provider network/data center 152, 408), such as on one or more processor of one or more server (e.g., 120) and/or remote computing device (e.g., 226). Some operations of the method 600 may additionally or alternatively be implemented by one or more control entity of one or more home gateway 300, such as the processor(s) 304.

In block 602, the service network processor may receive a subscriber's selection of one or more service group, such as through a subscriber portal (e.g., 504) over a wireless or wired communication to the service network. In block 604, the service network processor may select an existing service template that matches the subscriber's selection. In various embodiments, the selection may be performed by a template master (e.g., 508) and/or template manager (e.g., 506), or other template service entity. In block 606, the service network processor may generate configuration instructions based on the selected service template. For example, configuration instructions may be generated by OSS elements in conjunction with other components of the service network (e.g., DHCP domain manager, identity manager, etc.) for the template manager to trigger the execution of those instructions. In some embodiments, generating configuration instructions may use the various service parameters and pre-set configurations (e.g., requirements for bandwidth, latency, QoS, security, peripheral device access, etc.) that define each service group of the selected service template. For example, generating the configuration instructions may include generating and assigning to the service group a unique PSK. Handling PSKs for the various service group may be performed by an entity responsible for network services in some embodiments. In some embodiments, generating the configuration instructions may also include setting parameters that establish a distinct VLAN corresponding to the service group (or multiple VLANs if there is more than one service group in the micro-Domain). The parameters may include, for example, a VLAN number, name, type, maximum transmission unit (MTU) for the VLAN, security association identifier (SAID), and others. In some embodiments, generating the configuration instructions may also include allocating a unique IP address range to create a distinct subnetwork. IP address allocation may be performed, for example, by a network services entity of the service network, such as a DHCP domain manager.

In block 608, the service network processor may apply the configuration instructions to create micro-domain(s) in the subscriber's home network, or VGW. For example, the template manager other entity may implement containers to automatically partition the subscriber's home network of VGW into a micro-domain corresponding to each service group(s). Depending on the features of the service group(s), applying the configuration instructions may create separate VLAN/subnetworks that provide an optimized operating environments for the various device types selected by the subscriber. While presented as distinct operations, the steps involved in generating the configuration instructions and applying the configuration instructions to create micro-domains may be performed in the same or simultaneous operations in some embodiments.

In block 610, the service network processor may detect any user devices that are connected to the subscriber's home network. In some embodiments, information identifying connected user devices may be gathered by the subscriber's home gateway and automatically forwarded to a component of the service network.

In block 612, the service network processor may identify features of each detected device. In some embodiments, such feature identification may be performed without subscriber involvement using technologies such as device fingerprinting, MUD, CUJO AI, and others. For example, the service network may identify features based on information describing the device capabilities and expected behaviors, received either directly from the device or from the home gateway to which it is connected. In some embodiments, the service network may identify features of a user device using manufacturer-provided descriptions, which may be accessed automatically through a URL provided by the device.

In block 614, the service network processor may automatically assign each detected user device to a micro-domain of the subscriber's home network or VGW. In various embodiments, such assignment may be based on the identified features of each detected device. Once each detected device has been assigned to a micro-domain, the service network processor may repeat the operations of blocks 610-614 if one or more new device is added to the subscriber's home network.

Figure 7A:
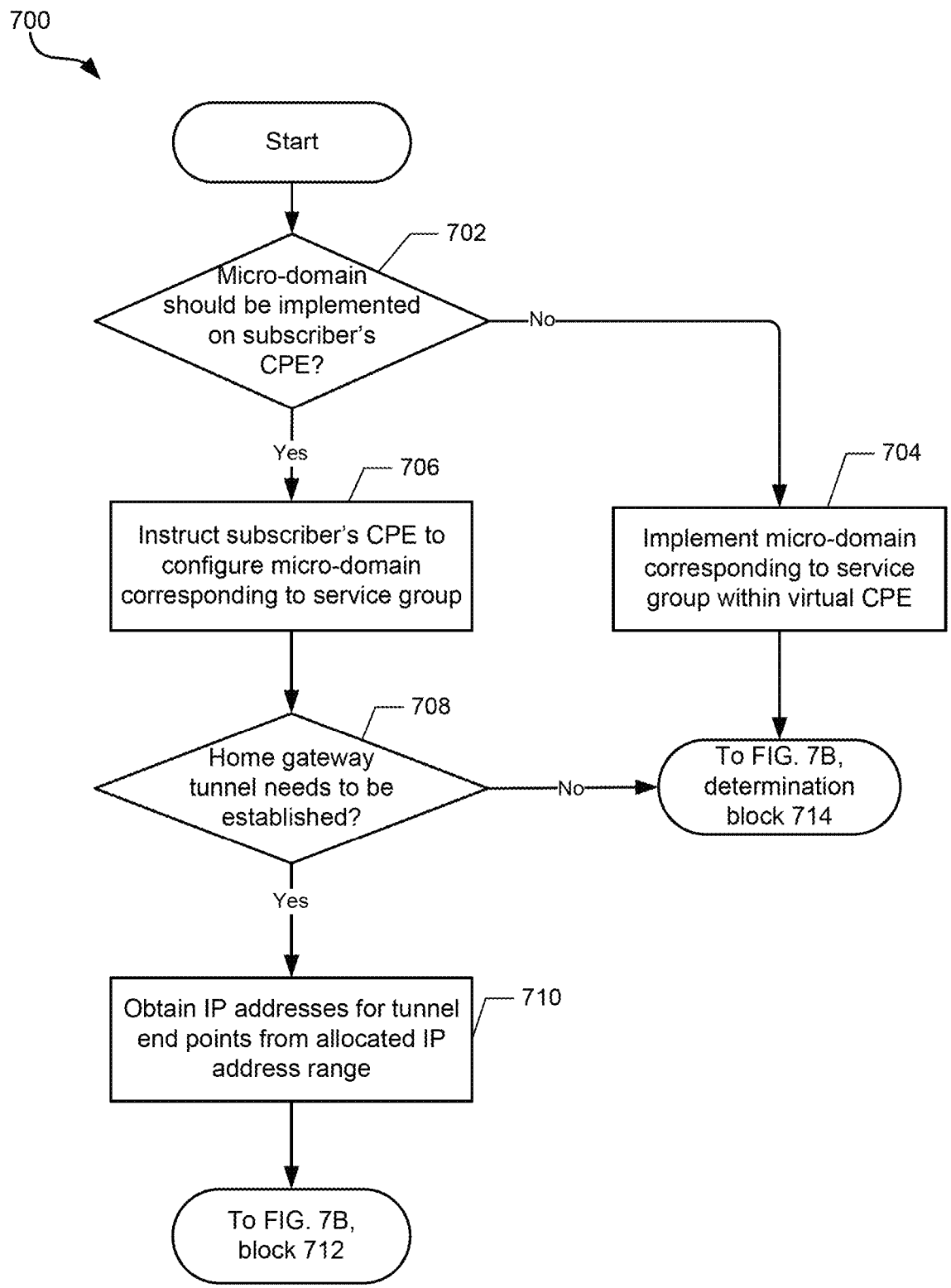
FIGS. 7A and 7B are process flow diagrams illustrating an example method for generating and applying configuration instructions as part of the micro-domain creation in FIG. 6.
Figure 7B:
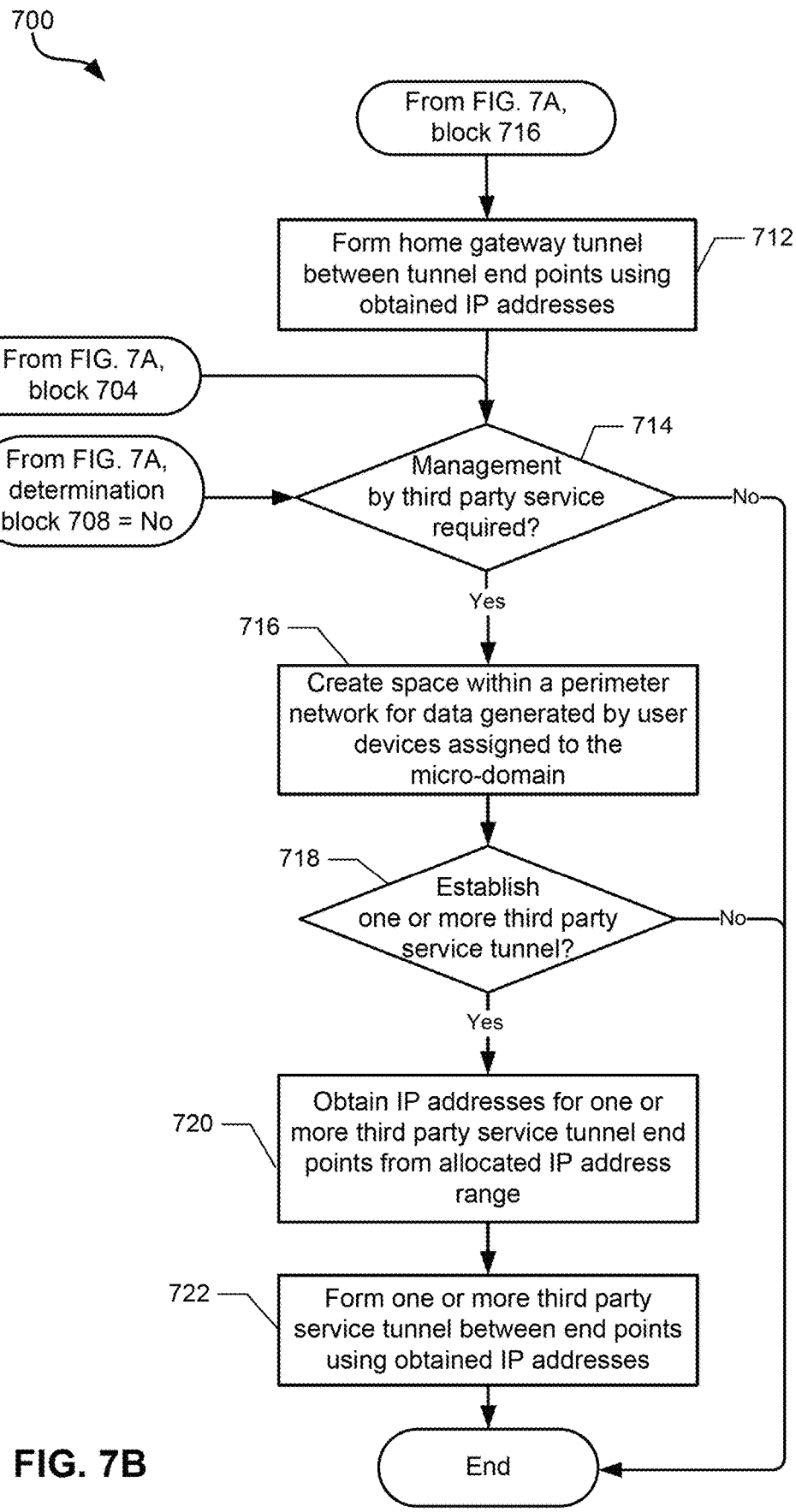

FIGS. 7A-7B illustrate a method 700 of generating and applying configuration instructions to create micro-domain(s) in the subscriber's home network or VGW in blocks 606-608 of FIG. 6. Specifically, the operations of the method 600 may be performed for each service group of the template selected by the subscriber (e.g., in block 604 of FIG. 5). With reference to FIGS. 1-7B, the operations of the method 700 may be implemented by one or more one or more control entity within a service network (e.g., service network 116, service provider network/data center 152, 408), such as on one or more processor of one or more server (e.g., 120) and/or remote computing device (e.g., 226). Some operations of the method 700 may additionally or alternatively be implemented by one or more control entity of one or more home gateway 300, such as the processor(s) 304.

In determination block 702, the service network processor may determine whether a micro-domain for the service group should be implemented on the subscriber's CPE. In some embodiments, the decision of whether to implement the service group on the subscriber's CPE rather than on the service network may be based on features defining the service group (e.g., service parameters and pre-set configurations).

In response to determining that a micro-domain for the service group should not be implemented on the subscriber's CPE (i.e., determination block 702="No"), the service network processor may implement a micro-domain corresponding to the service group within a virtual CPE in block 704. In some embodiments, the virtual CPE may be a portion of memory that is physically located on a server or other component in the service network, but that appears to the subscriber as being on the home gateway/subscriber's CPE. Implementing the micro-domain within the virtual CPE may be performed using the configuration instructions associated with the corresponding service group, which may include associated PSK, VLAN parameters, and IP address range, as well as other information.

In response to determining that a micro-domain for the service group should be implemented on the subscriber's CPE management by a third party service is required (i.e., determination block 702="Yes"), the service network processor may instruct the subscriber's CPE to configure a micro-domain corresponding to the service group in block 706. In some embodiments, the service network may send to the subscriber's CPE a software package with configuration instructions, including PSK, VLAN parameters, and IP address range, and features defining the service group (e.g., service parameters and pre-set configurations). In determination block 708, the service network processor may determine whether a home gateway tunnel needs to be established for the micro-domain. Specifically, a home gateway tunnel may be established to provide privacy during transport between the subscriber's CPE and/home gateway and the virtual CPE. In some embodiments, the service network processor may determine whether such tunnel needs to be established based on features defining the selected service group. For example, the configuration instructions in the software package used to create the micro-domain may include a requirement for an encrypted tunnel associated with the selected service group. In some embodiments, configuration instructions requiring an encrypted tunnel may include specific privacy and/or security requests.

In response to determining that a home gateway tunnel needs to be established for the micro-domain (i.e., determination block 708="Yes"), the service network processor may obtain IP addresses for the tunnel end points from the allocated range of IP addresses in block 710. Specifically, the service network processor may retrieve two IP addresses from a range of IP addresses allocated to the micro-domain, one for each of the subscriber's CPE and the termination point in the service network (e.g., virtual CPE).

In block 712, the service network processor may form the home gateway tunnel between the tunnel end points using the obtained IP addresses from block 710.

In response to determining that a home gateway tunnel does not need to be established for the micro-domain (i.e., determination block 708="No"), or following block 704 or 712, the service network processor may determine whether management by a third party service is required for the micro-domain in determination block 714. In some embodiments, the pre-set configurations for the selected service group may specify whether third party management is required.

In response to determining that management by a third party service is required for the micro-domain (i.e., determination block 714="Yes"), the service network processor may create a space within a perimeter network (i.e., demilitarized zone) of the service network for data generated by user devices assigned to the micro-domain in block 716. In some embodiments, the perimeter network may be a sub-network that provides external entities with controlled access to user device data.

In determination block 718, the service network processor may determine whether to establish one or more third party service tunnel for the micro-domain. In some embodiments, a third party service tunnel may be established with Service Level Agreement (SLA) between the perimeter network and a third party service, enabling the third party service to monitor data and manage actions/parameters for devices within the micro-domain.

In response to determining that management by a third party service is not required (i.e., determination block 716="No") or not to establish one or more third party service tunnel (i.e., determination block 718="No"), method 700 may end.

In response to determining to establish one or more third party service tunnel (i.e., determination block 718="Yes"), the service network processor may obtain IP addresses for the third party service tunnel end points from the allocated range of IP addresses in block 720. Specifically, for each third party service tunnel, the service network processor may retrieve two IP addresses from the range allocated to the micro-domain, one for each of the perimeter network and a third party service.

In block 722, the service network processor may form one or more third party service tunnel using the obtained IP addresses from block 720. In some embodiments, the tunneling protocol used (e.g., VxLAN, IPSec, GRE, etc.) may depend at least in part on any specific privacy and/or security requests provided by the configuration instructions. After forming the one or more third party service tunnel, the method 700 may end.

Figure 8:
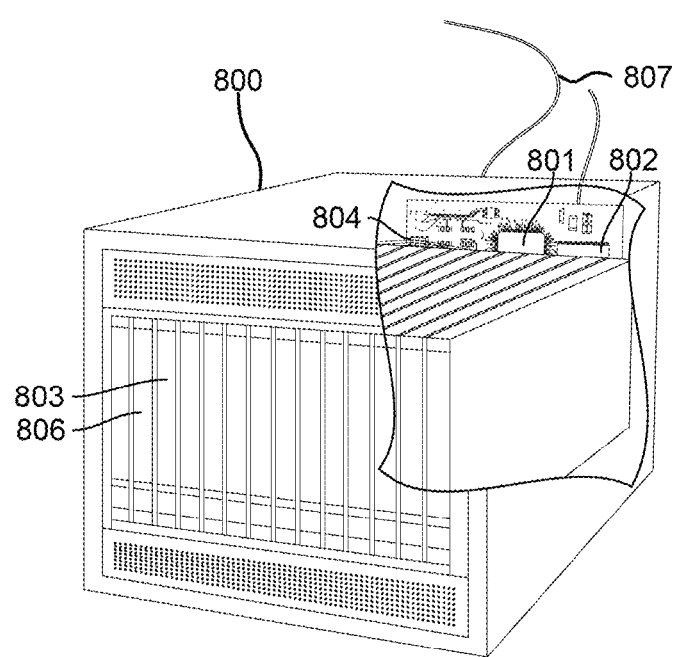
FIG. 8 is a component block diagram of an example server suitable for use with various embodiments.

The various embodiments may be implemented on any of a variety of commercially available server devices, such as the server 800 illustrated in FIG. 8. For example, with reference to FIGS. 1-8, a server 800 (which may correspond, for example, to the server 120 and/or the remote computing device 326 in FIGS. A and 3, respectively) may include a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing network interface connections with a network 807, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Figure 9:
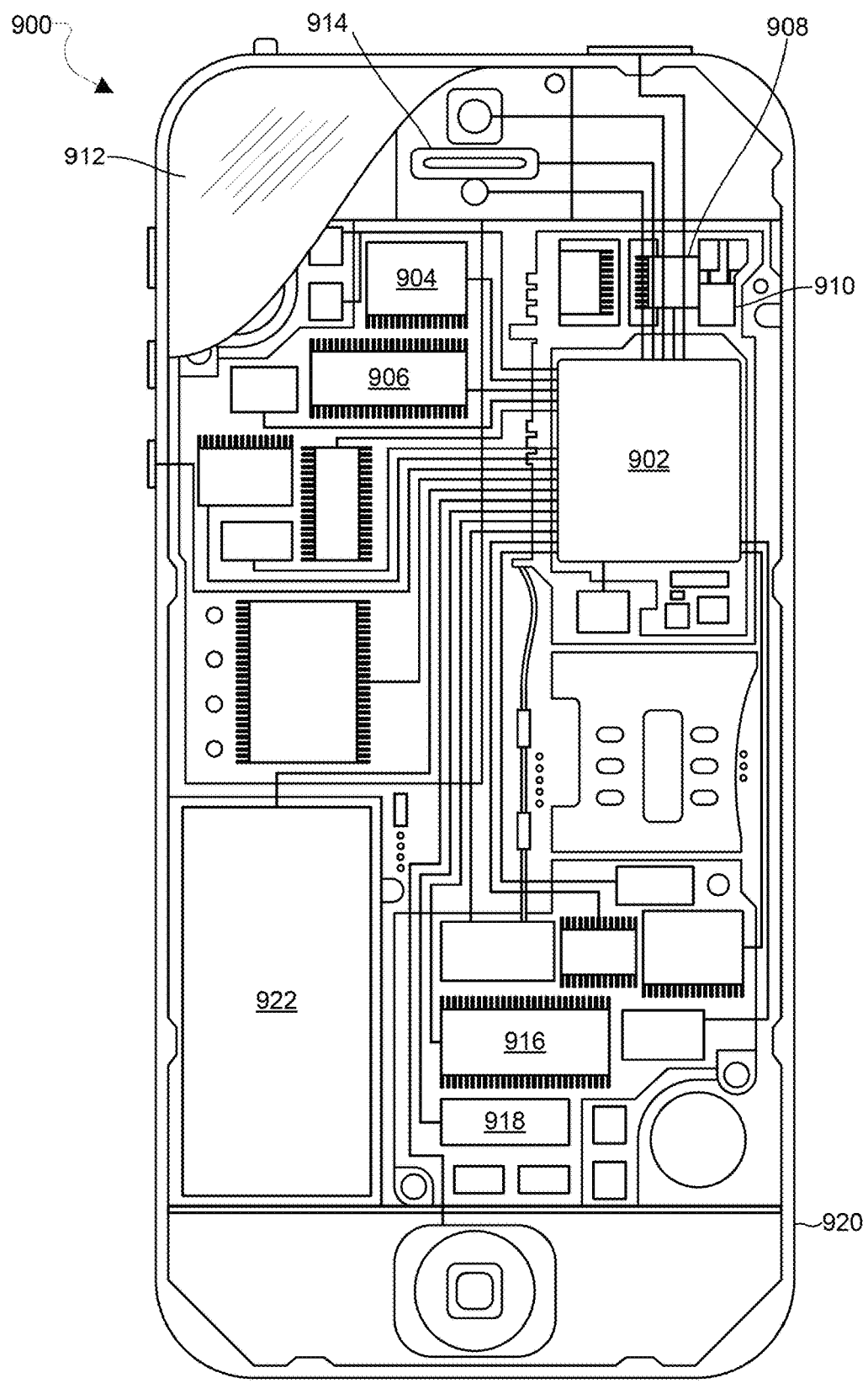
FIG. 9 is a component diagram of an example wireless communication device suitable for use with the various embodiments.

Various embodiments may also be implemented in any of a variety of wireless devices, an example of which is illustrated in FIG. 9. For example, with reference to FIGS. 1-9, a wireless device 900 (which may correspond, for example, the end user devices 102 and/or the home gateway 300 in FIGS. 1 and 3, respectively) may include a processor 902 coupled to a touchscreen controller 904 and an internal memory 906. The processor 902 may be one or more multicore integrated circuits (ICs) designated for general or specific processing tasks. The internal memory 906 may be volatile or non-volatile memory, and may also be secure and/or encrypted memory, or unsecure and/or unencrypted memory, or any combination thereof The touchscreen controller 904 and the processor 902 may also be coupled to a touchscreen panel 812, such as a resistive-sensing touchscreen, capacitive-sensing touchscreen, infrared sensing touchscreen, etc. The wireless device 900 may have one or more radio signal transceivers 908 (e.g., Peanut®, Bluetooth®, Zigbee®, Wi-Fi, RF radio) and antennae 810, for sending and receiving, coupled to each other and/or to the processor 902. The transceivers 908 and antennae 810 may be used with the above-mentioned circuitry to implement the various wireless transmission protocol stacks and interfaces. The wireless device 900 may include a cellular network wireless modem chip 816 that enables communication via a cellular network and is coupled to the processor. The wireless device 900 may include a peripheral device connection interface 818 coupled to the processor 902. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The wireless device 900 may also include speakers 814 for providing audio outputs. The wireless device 900 may also include a housing 820, constructed of a plastic, metal, or a combination of materials, for containing all or some of the components discussed herein. The wireless device 900 may include a power source 822 coupled to the processor 902, such as a disposable or rechargeable battery. The rechargeable battery may also be coupled to the peripheral device connection port to receive a charging current from a source external to the wireless device 900.

The processors 801, 902, and modem or modem chip 816 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into the processors 801, 902, and modem or modem chip 816. The processors 801, 902, and modem or modem chip 816 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801, 902, and modem or modem chip 816, including internal memory or removable memory plugged into the wireless communication device and memory within the processors 801, 902, and modem or modem chip 816 themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing a home network associated with a subscriber of a communications service provider, the method comprising:
    detecting an end user device connected to the home network;
    passing information about the detected end user device to a network associated with the communications service provider, wherein the information provides an identity and operating characteristics of the end user device;
    receiving information about a micro-domain to which the end user device is assigned, wherein the micro-domain comprises a distinct virtual local area network (VLAN) and subnetwork associated with a set of network access policies for the end user device; and
    controlling access to the home network by the end user device based on the assigned micro-domain.

2. The method of claim 1, wherein the network access policies are configured to provide an optimized operating environment for devices having common needs to those of the end user device.

3. The method of claim 1, further comprising passing performance data of the end user device to the network associated with the communications service provider, wherein the performance data is used to validate performance needs of the end user device against parameters of the micro-domain.

4. The method of claim 1, wherein receiving information about the micro-domain includes receiving a unique internet protocol (IP) address range within a host part of the IP address for the home network.

5. The method of claim 1, wherein receiving information about the micro-domain includes receiving a unique pre-shared key (PSK) assigned to the micro-domain, wherein the unique PSK is utilized to prevent unauthorized joining by an outside device.

6. The method of claim 1, wherein the information about the detected end user device includes at least one of a brand, a model, or an operating system of the end user device.

7. The method of claim 1, wherein the information about the detected end user device includes information describing at least one of device capabilities or expected behaviors of the end user device.

8. The method of claim 1, wherein controlling access to the home network by the end user device comprises applying a tunneling protocol that provides a virtual point-to-point link over an internet protocol (IP) network between the end user device and the network associated with the communications service provider.

9. A home gateway for a subscriber of a communications service provider, comprising:
    at least one network interface; and
    a processor coupled to at least one memory, wherein the processor is configured with processor-executable instructions to:
        detect an end user device connected to a home network associated with the subscriber;
        pass information about the detected end user device to a network associated with the communications service provider, wherein the information provides an identity and operating characteristics of the end user device;
        receive information about a micro-domain to which the end user device is assigned, wherein the micro-domain comprises a distinct virtual local area network (VLAN) and subnetwork associated with a set of network access policies and for the end user device, and
        control access to the home network by the end user device based on the assigned micro-domain.

10. The home gateway of claim 9, wherein the network access policies are configured to provide an optimized operating environment for devices having common needs to those of the end user device.

11. The home gateway of claim 9, wherein the processor is further configured with processor-executable instructions to pass performance data of the end user device to the network associated with the communications service provider, wherein the performance data is used to validate performance needs of the end user device against parameters of the micro-domain.

12. The home gateway of claim 9, wherein the processor is configured with processor-executable instructions to receive information about the micro-domain by receiving a unique internet protocol (IP) address range within a host part of the IP address for the home gateway.

13. The home gateway of claim 9, wherein the processor is configured with processor-executable instructions to receive information about the micro-domain by receiving a unique pre-shared key (PSK) assigned to the micro-domain, wherein the unique PSK is utilized to prevent unauthorized joining by an outside device.

14. The home gateway of claim 9, wherein the information about the detected end user device includes at least one of a brand, a model, or an operating system of the end user device.

15. The home gateway of claim 9, wherein the information about the detected end user device includes information describing at least one of device capabilities or expected behaviors of the end user device.

16. The home gateway of claim 9, wherein the processor is configured with processor-executable instructions to control access to the home network by applying a tunneling protocol that provides a virtual point-to-point link over an internet protocol (IP) network between the end user device and the network associated with the communications service provider.

* * * * *